United States Patent
Valle et al.

(10) Patent No.: US 10,531,641 B2
(45) Date of Patent: Jan. 14, 2020

(54) DESTRUCTION RESISTANT PET TOYS

(71) Applicant: Doskocil Manufacturing Company, Inc., Arlington, TX (US)

(72) Inventors: Andrea Valle, Dover, NJ (US); Jonathan Willinger, Tenafly, NJ (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 804 days.

(21) Appl. No.: 13/676,457

(22) Filed: Nov. 14, 2012

(65) Prior Publication Data
US 2014/0130750 A1 May 15, 2014

(51) Int. Cl.
A01K 15/02 (2006.01)

(52) U.S. Cl.
CPC .................. A01K 15/025 (2013.01)

(58) Field of Classification Search
CPC .............................. A01K 15/025; A01K 15/02
USPC .......................................... 119/707, 709, 711
See application file for complete search history.

(56) References Cited

U.S. PATENT DOCUMENTS

| | | | |
|---|---|---|---|
| 6,112,703 A | 9/2000 | Handelsman | |
| 6,116,191 A | 9/2000 | Suchowski et al. | |
| 6,202,598 B1 | 3/2001 | Willinger | |
| 6,216,640 B1 | 4/2001 | Zelinger | |
| 6,305,226 B1 | 10/2001 | Barber et al. | |
| 6,305,326 B1 | 10/2001 | Suchowski et al. | |
| D450,894 S | 11/2001 | Suchowski et al. | |
| 6,360,695 B2 | 3/2002 | Suchowski et al. | |
| 6,415,741 B2 | 7/2002 | Suchowski et al. | |
| 6,474,268 B1 | 11/2002 | Suchowski et al. | |
| 6,892,674 B1 * | 5/2005 | Dubinins et al. | 119/707 |
| 6,981,471 B1 * | 1/2006 | Dubinins et al. | 119/710 |
| 7,063,044 B2 * | 6/2006 | Handelsman et al. | 119/709 |
| 7,410,662 B1 | 8/2008 | Tsengas | |
| 7,694,653 B2 | 4/2010 | Axelrod | |
| 7,736,213 B2 | 6/2010 | Willinger et al. | |
| 7,810,455 B2 | 10/2010 | Axelrod et al. | |
| 7,833,079 B2 | 11/2010 | Willinger et al. | |
| 8,807,088 B2 * | 8/2014 | Axelrod et al. | 119/710 |
| 2004/0244719 A1 | 12/2004 | Jager | |
| 2005/0115517 A1 * | 6/2005 | Wolfe et al. | 119/707 |
| 2010/0041302 A1 | 2/2010 | Rutherford et al. | |
| 2011/0277696 A1 * | 11/2011 | Rutherford et al. | 119/707 |
| 2012/0090554 A1 * | 4/2012 | Nunn | A01K 15/025 119/707 |
| 2012/0272922 A1 * | 11/2012 | Axelrod et al. | 119/709 |
| 2014/0109841 A1 * | 4/2014 | Vap | 119/707 |

* cited by examiner

*Primary Examiner* — Son T Nguyen
(74) *Attorney, Agent, or Firm* — Global IP Counselors, LLP

(57) ABSTRACT

In accordance with one or more embodiments of the present invention, a destruction resistant pet toy includes a first member having a first material, the first material being a destruction resistant nylon; a second member having a second material, the second material being softer than the first material; wherein the destruction resistant nylon comprises a Shore D hardness. The first member may be a substantially tubular structure having an inner space and the second member is disposed at least partially within the inner space of the first member.

10 Claims, 7 Drawing Sheets

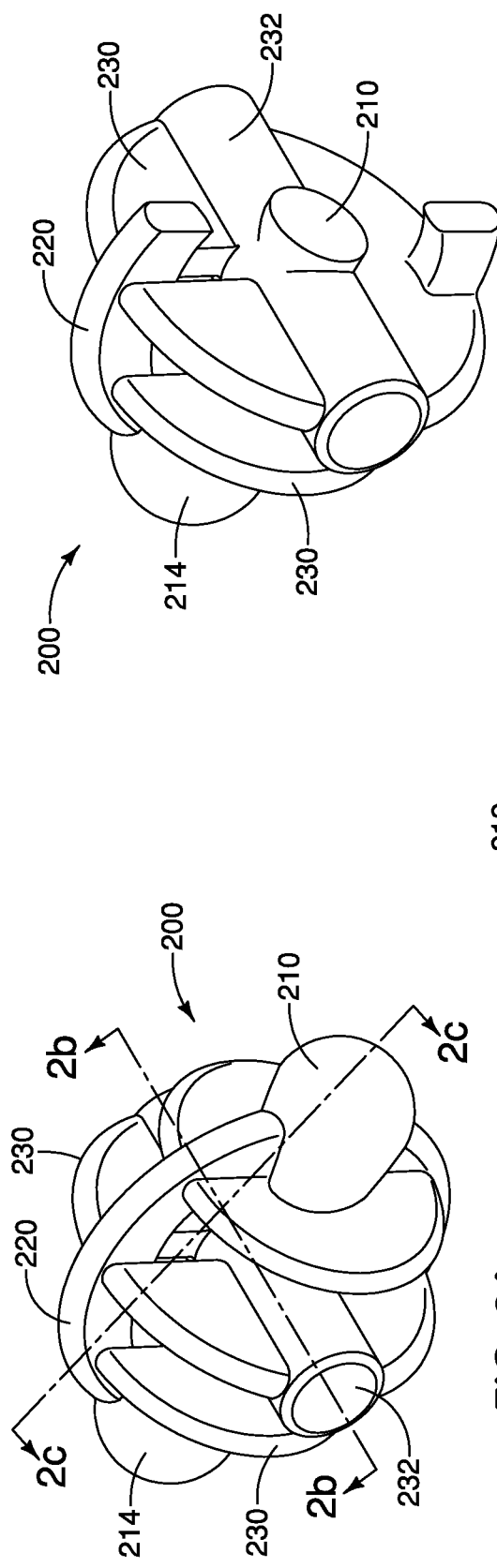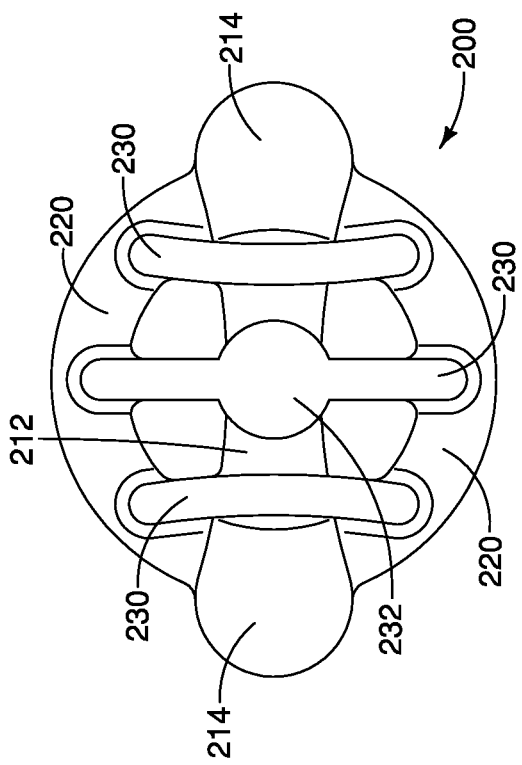

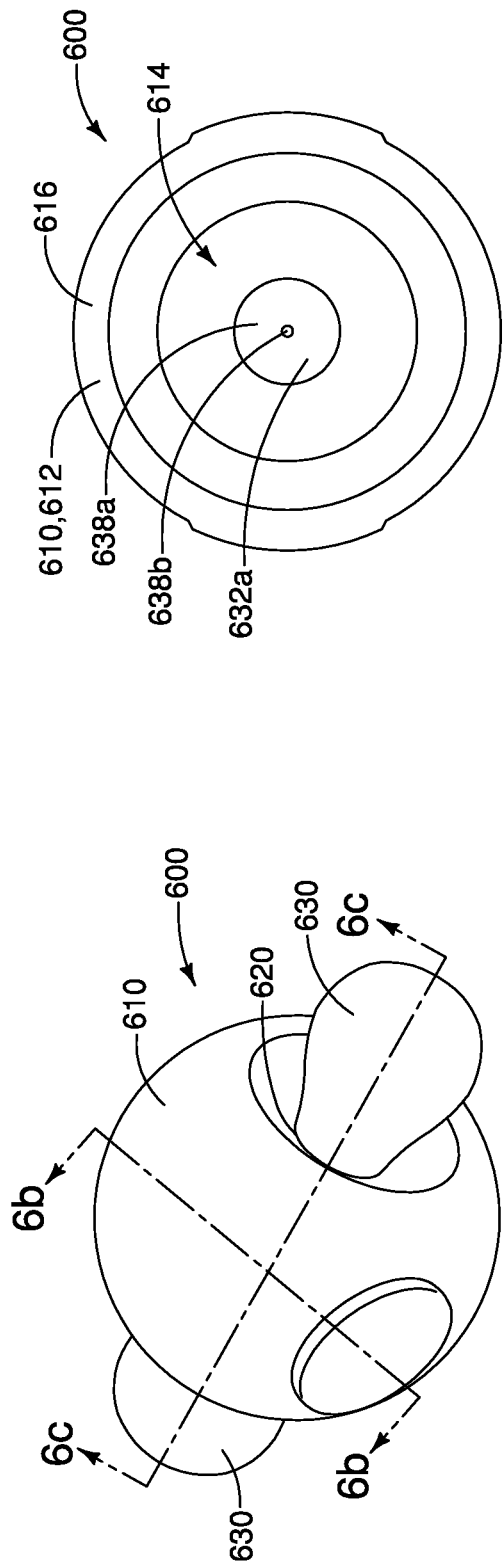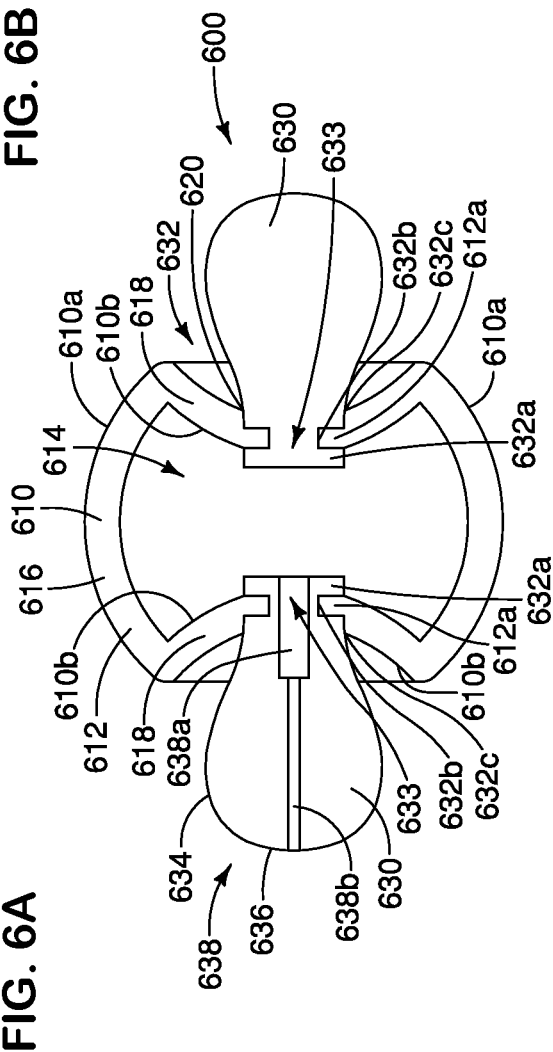

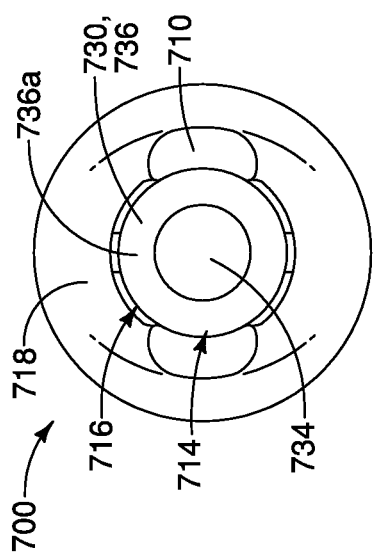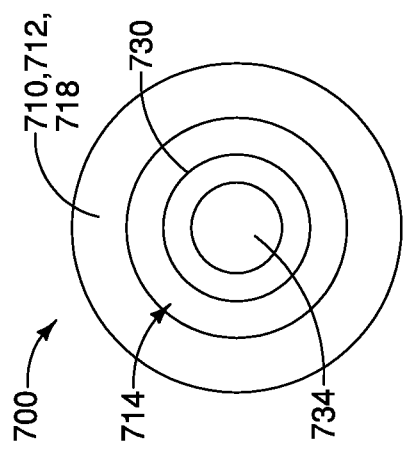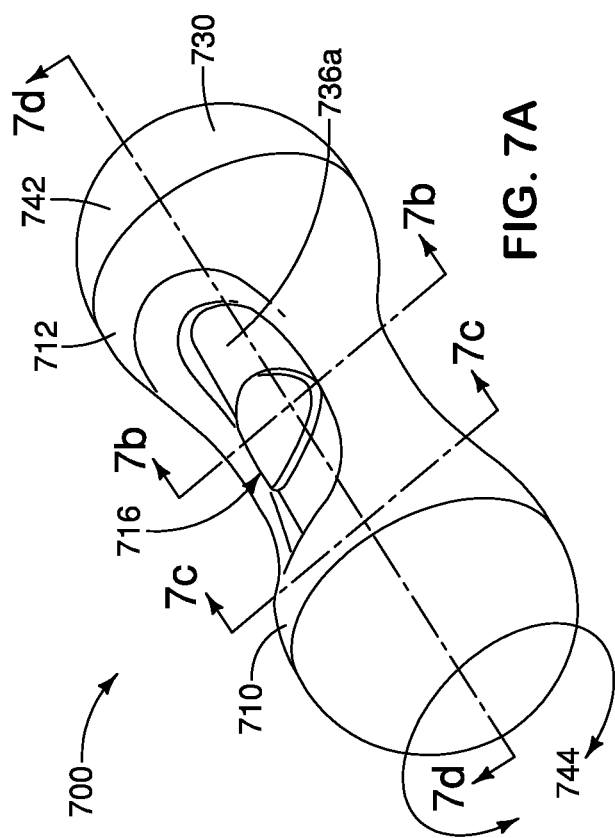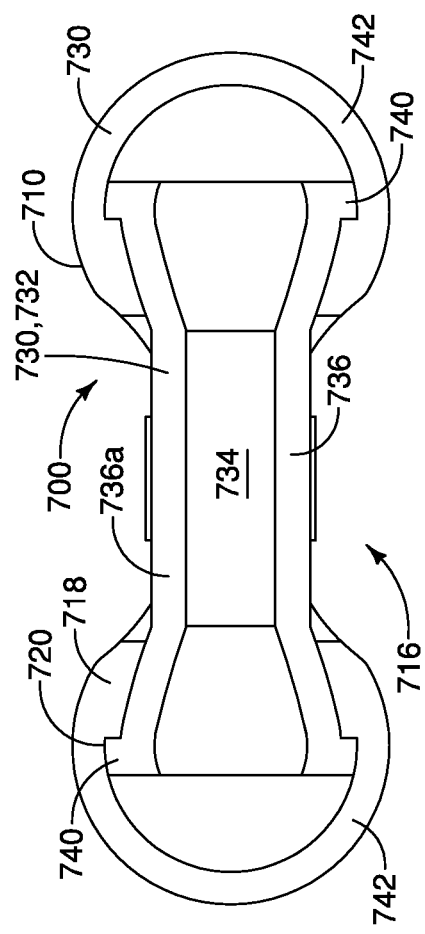

DESTRUCTION RESISTANT PET TOYS

BACKGROUND OF THE INVENTION

Field of the Invention

The present invention is directed to one or more embodiments of pet toys, each of which is resistant to destruction caused by the chewing action of a pet.

Discussion of the Related Art

A successful pet toy must satisfy six general criteria ("general criteria"): (1) may not be injurious to a pet; (2) design attractiveness to a purchaser; (3) initial interest by the pet; (4) continued engagement by the pet; (5) durability when played with by a pet; and (6) price attractiveness to a purchaser.

Design attractiveness to a purchaser ("design attractiveness") requires that the pet toy have an aesthetic appearance that make the stand out among shelves of pet toys in a retail location Initial interest by the pet ("initial interest") requires that upon first encountering the pet toy, the pet should show an interest in playing with the toy. This can be achieved by an appealing shape, interesting sound, insertion of a treat, or other means.

Initial interest does not guaranty that the pet will continue to engage the toy ("continued engagement"). Continued engagement requires that the toy presents sufficient interest, for example, by removing a treat hidden inside a pet toy, so that the pet will play with the toy even after having been exposed to it.

Durability requires that the pet toy resist damage or destruction for a prolonged period. Price attractiveness to a purchaser ("price attractiveness") requires that the selling price of the pet toy be properly positioned for the kind of pet toy that is being purchased. Since the retail price is typically multiples of the manufacturing costs, price attractiveness means that the cost of manufacture be appropriate for the toy. However, as each of the general criteria is met, the costs increase.

A tennis ball or a tennis ball style toy meets many, but not all, of the criteria. It uses a core that is made of inexpensive rubber on which inexpensive felt material is glued. While pets, especially dogs, show an initial interest and continue to engage with the toy, the felt has a tendency to cause wear on the teeth of the pet.

Tennis balls also do not last long with aggressively biting pets. Tennis balls are typically filled with pressurized air so that the ball has sufficient bounce for competitive sport play. Aggressive biters readily breach the core of a tennis ball rendering it limp and uninteresting for the pet.

From empirical observations, it is believed that purchasers find a tennis ball to be a purchase of last choice and is based simply on the minimal cost of a tennis ball or tennis ball style toy.

In contrast, an aesthetically pleasing rubber or vinyl pet toy has a higher likelihood of being purchased. These toys are designed to be safe for pets and pets generally show a great amount of interest in the toys when first introduced to them.

Vinyl toys are generally inexpensive, but not durable. Rubber toys tend to be durable based on the quality of rubber that is used, but the material costs also increase with an increase in rubber quality. Even when high quality rubber is used, limitations due to the manufacturing process may prevent a toy from being designed in such a way as to have continued engagement by the pet.

Durability is an important factor when a pet is an aggressive biter.

Thus, what is desired is a pet toy that satisfies all of the above criteria at an economical cost.

SUMMARY OF THE INVENTION

These and other criteria are met by the present invention of a destruction resistant pet toy.

In accordance with one or more embodiments of the present invention, a destruction resistant pet toy includes a first member having a first material, the first material being a destruction resistant nylon; a second member having a second material, the second material being softer than the first material; wherein the destruction resistant nylon comprises a Shore D hardness. The first member may be a substantially tubular structure having an inner space and the second member is disposed at least partially within the inner space of the first member. The first member may have a pair of lateral openings framed by the first member, each lateral opening permitting access for teeth of a pet to the second member. The second member is rotatable relative to the first member.

The destruction resistant pet toy may include a squeaker mounted in the second member and an inner space formed by the second member, the inner space holding a volume of air, the squeaker making a sound when the air leaves the inner space. The second member has a median section disposed inside an inner space of the first member and an end section disposed adjacent to an end of the second member. The end section may have dome shaped.

In accordance with one or more embodiments of the present invention, a destruction resistant pet toy includes a first member having a first material, the first material being a destruction resistant nylon; a second member having a second material, the second material being softer than the first material; wherein the destruction resistant nylon comprises a Shore D hardness. The second member includes a shell having an opening, and the first member includes a retention structure for securing the first member to the second member. The retention structure includes a backing plate and a receiving groove. The first member may include a cavity for housing a squeaker.

The shell of the second member includes an inwardly deformed wall zone proximal to the opening. The end section is proximal to a deformed wall zone of the shell.

In accordance with one or more embodiments of the present invention, a destruction resistant pet toy includes a first member having a first material, the first material being a destruction resistant nylon; a second member having a second material, the second material being softer than the first material; wherein the destruction resistant nylon comprises a Shore D hardness. The second member includes a shell defining an inner space and an opening in the shell, and the first member includes a medial section, a connecting section, and an end section. The medial section is disposed entirely within the inner space. The connecting section passes through the opening, and the end section is disposed entirely outside of the inner space.

Therein, the first member is rotatable and swivelable relative to the second member. The shell includes an inwardly deformed wall zone surrounding the opening. The end section is proximal to the deformed wall zone of the shell. The medial section is elongated along a first longitudinal axis and the first member has a second longitudinal axis, the axes being substantially perpendicular to each other.

In accordance with one or more embodiments of the present invention, a destruction resistant pet toy includes a first member having a first material, the first material being a destruction resistant nylon; a second member having a second material, the second material being softer than the first material; wherein the destruction resistant nylon comprises a Shore D hardness. The first member may be a substantially tubular structure having an inner space and the second member is disposed at least partially within the inner space of the first member. The first member includes a plurality of transverse ribs and a plurality of longitudinal ribs. The second member includes a rope knotted at one end of the rope.

BRIEF DESCRIPTION OF THE DRAWINGS

FIG. 2A is an isometric view of a destruction resistant pet toy in accordance with one or more embodiments of the present invention.

FIG. 2B is a transverse cross-sectional view of the destruction resistant pet toy of FIG. 2A.

FIG. 2C is a longitudinal cross-sectional view of the destruction resistant pet toy of FIG. 2A.

FIG. 6A is an isometric view of a destruction resistant pet toy in accordance with one or more embodiments of the present invention.

FIG. 6B is a transverse cross-sectional view of the destruction resistant pet toy of FIG.6A.

FIG. 6C is a longitudinal cross-sectional view of the destruction resistant pet toy of FIG. 6A.

FIG.7A is an isometric view of a destruction resistant pet toy in accordance with one or more embodiments of the present invention.

FIG.7B is a first transverse cross-sectional view of the destruction resistant pet toy of FIG. 7A.

FIG. 7C is a second transverse cross-sectional view of the destruction resistant pet toy of FIG. 7A.

FIG. 7D is a longitudinal cross-sectional view of the destruction resistant pet toy of FIG. 7A.

DETAILED DESCRIPTION OF THE INVENTION

Figure 1B:
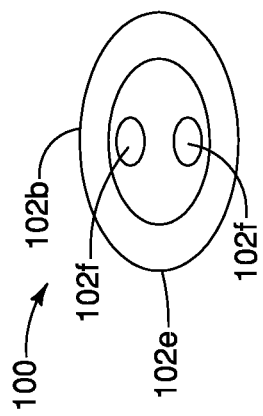
FIG. 1B is a transverse cross-sectional view of the destruction resistant pet toy of FIG. 1A.

In accordance with one or more embodiments of the present invention, destruction resistant pet toys 100-700 or a combination thereof meets each of the general criteria with an emphasis on general criteria (4) continued engagement by the pet, criteria (5) durability when played with by a pet, and criteria (6) price attractiveness to a purchaser.

In accordance with one or more embodiments of the present invention, each toy 100-700 comprises a material that resists destruction, i.e. "a destruction resistant material." Specifically, in accordance with one or more embodiments of the present invention, each toy 100-700 comprises a destruction resistant material alone or in combination with another material and is made according to an industrially economical method. The destruction resistant material may be a destruction resistant nylon, which is taught further herein, alone or combined with another material. However, in accordance with one or more embodiments of the present invention, the destruction resistant material consists solely of a destruction resistant nylon, which is taught further herein.

In accordance with one or more embodiments of the present invention, each toy 100, 200, and 400 solely consists of the destruction resistant material. Destruction resistant material consists of a destruction resistant nylon, which is taught further herein, and is combined with another material. However, in accordance with one or more embodiments of the present invention, the destruction resistant material consists solely of a destruction resistant nylon, which is taught further herein. Specifically, in accordance with one or more embodiments of the present invention, each toy 100, 200, and 400 solely consists of a destruction resistant nylon alone and is made according to an industrially economical method.

The base costs of the destruction resistant material and or the destruction resistant nylon is competitive with other materials used in pet toys and the manufacturing method, typically injection molding or pressure molding, provides significant economic advantages that can be passed on to purchasers, thus, meeting general criteria (6).

In accordance with one or more embodiments of the present invention, the destruction resistant material comprises polycaprolactam. Polycaprolactam is also known as nylon 6 or polyamide 6. Preferably, the destruction resistant nylon has a density of 1.13 g/cm$^3$, hardness of 71 Shore D, a heat distortion temperature of 53° C. at 264 psi, a melting point of 220° C., and a relational viscosity of 2.3.

In accordance with one or more embodiments of the present invention, the destruction resistant nylon consists of polycaprolactam. In accordance with another embodiment, the destruction resistant nylon consists of a material having hardness of 68-75 durometer Shore D. In accordance with one or more embodiments of the present invention, the destruction resistant nylon also comprise or consists of one of nylon 6/6, nylon 6/12, polyamide 12, nylon 121, nylon 12, or polyamide 46.

In accordance with one embodiment of the present invention, the destruction resistant pet toy comprises a second-type material which is "softer", i.e., has less of a hardness on the Rockwell scale or Shore scale. Typically, the second-type material is one or more natural or synthetic rubber compounds, styrene butadiene styrene (SBS), and/or styrene ethylbutadiene styrene (SEBS). Preferably, the second-type material has a Shore A hardness.

A scent or taste material may be added to the destruction resistant nylon before, during, and/or after molding of toy 100-700 to enhance the initial interest and/or continued engagement by the pet. The destruction resistant nylon has been determined to have a superior durability due to all of its material properties; thus, meeting general criteria (5). The destruction resistant nylon is also readily available commercially and is easy to use in manufacturing; thus, meeting general criteria (6).

Of the general criteria, criteria (4) continued engagement is one of the most difficult to meet for pet toy designers, especially when designing toys comprising or consisting of nylon. Not all dogs are inherently interested in pet toys made of nylon, or even the more pleasant destruction resistant nylon, due to the inherent hardness. However, the hardness of the destruction resistant nylon is ideal for pets, especially dogs, in exercising their jaw muscles and using their incisors as well as their molars.

To solve the problem of continued engagement, each of the toys 100-700 comprises one or more features that causes the pet to have continued engagement with the toy, especially engaging in chewing behavior and, even more particularly, engaging in prolonged chewing behavior. "Engage in chewing behavior" or "engaging in chewing behavior" means to bite the toy, to chew the toy, or to tear at the toy wherein the pet uses substantially all their jaw muscles and uses their incisors as well as their molars. "Engage in prolonged chewing behavior" or "engaging in prolonged chewing behavior" means to carry out the behavior for a prolonged and may be characterized by the pet, especially a dog, laying down, getting up, and laying down again while engaging in chewing behavior for a period of time of at least 3 minutes to the exclusion of other behavior such as chasing objects or living beings.

Each toy comprises features that are non-injurious to animals, and, in particular, to pets that bite and chew, such as dogs. The non-injurious features may comprise one or more of the following or, preferably, all of the following: use of non-toxic materials, non-toxic manufacturing process, non-breaking materials and elements, non-flaking materials and elements. The corners and/or intersections between any or all of the sides, members, surfaces, and/or bodies may be rounded, elongated, chamfered, inset, and/or treated in some other way to be non-injurious to the pet.

Figure 1A:
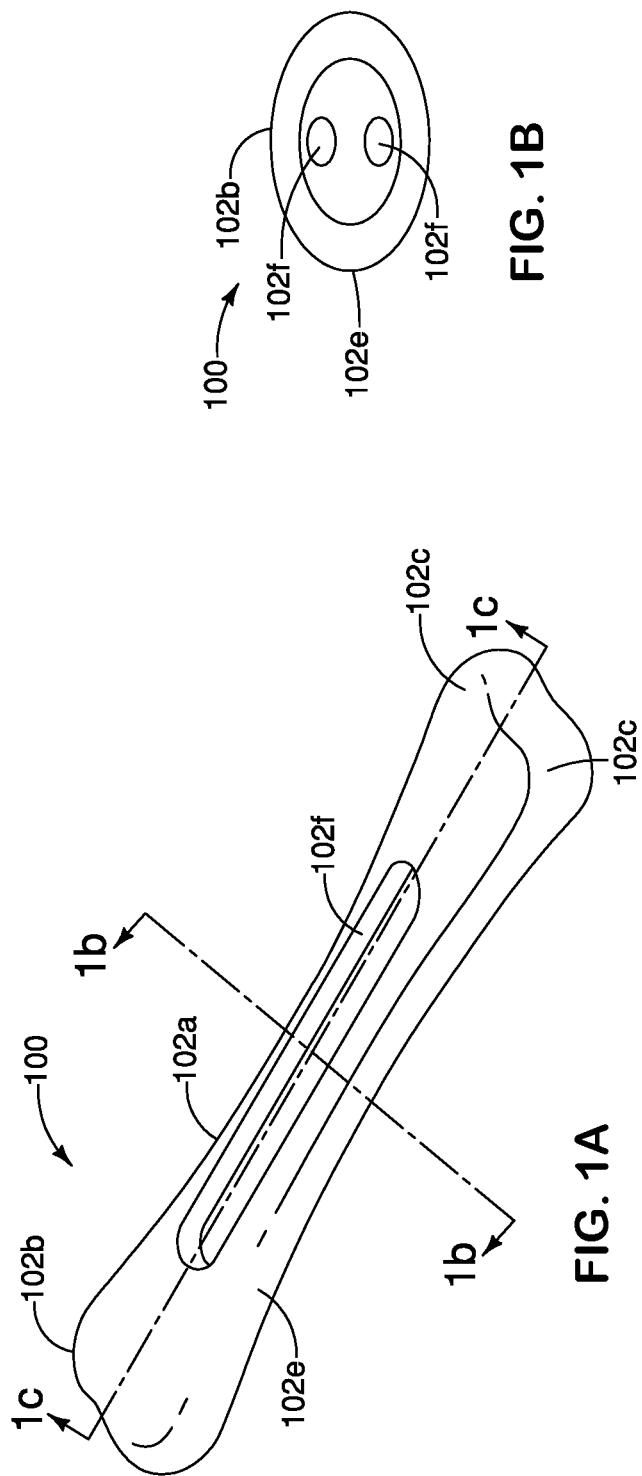
FIG. 1A is an isometric view of a destruction resistant pet toy in accordance with one or more embodiments of the present invention.
Figure 1C:
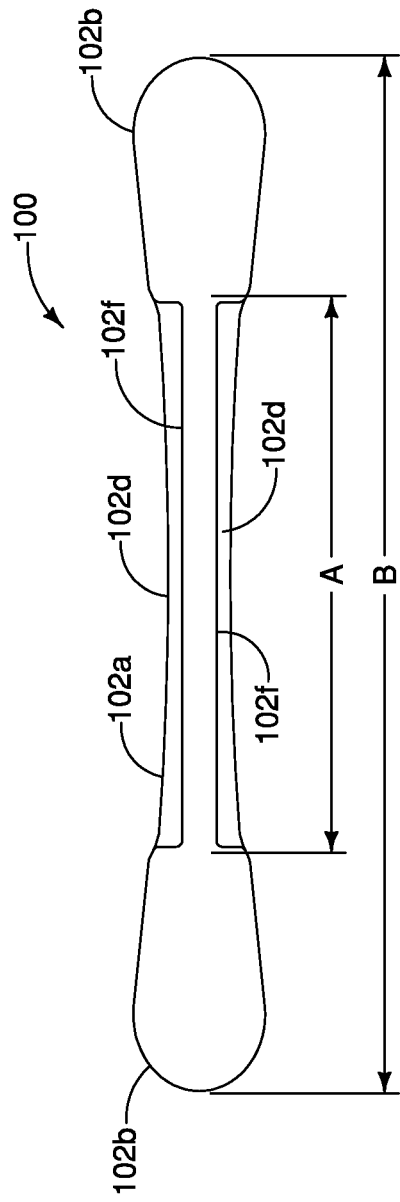
FIG. 1C is a longitudinal cross-sectional view of the destruction resistant pet toy of FIG. 1A.

FIG. 1A is an isometric view of a destruction resistant pet toy in accordance with one or more embodiments of the present invention. FIG. 1B is a transverse cross-sectional view of the destruction resistant pet toy of FIG. 1A. FIG.1C is a longitudinal cross-sectional view of the destruction resistant pet toy of FIG. 1A.

A destruction resistant pet toy 100 includes one or more channels that if filled with a treat such as peanut butter or with frozen chicken broth or even if just filled with water causes the pet to have continued engagement, i.e. general criteria (4), by engaging in prolonged chewing behavior with the destruction resistant pet toy 100.

Destruction resistant pet toy 100 preferably is configured to have a bone shape having a substantially longitudinal central body 102a and end portions 102b. Each end portion 102b preferably comprises a pair of condyles 102c. While more or less than one pair of condyles at each end are also embodied by the present invention, a pair of condyles 102c at each end portion 102b are preferred because the pair of condyles permits the pet to chew using its right-side and left-side molars on each end simply by changing the direction of "attack."

Destruction resistant pet toy 100, i.e. both body 102a and end portions 102b, comprises the destruction resistant material or the destruction resistant nylon. In accordance with one or more embodiments of the present invention, pet toy 100 preferably consists of the destruction resistant nylon. In any case excellent destruction resistance, especially in a solid form, is achieved by using the destruction resistant material or the destruction resistant nylon. However, less preferred, destruction resistant pet toy 100 may be hollow and, thus, need only include one or more layers of destruction resistant material or the destruction resistant nylon. Body 102a comprises pair of opposed major sides 102d and a pair of minor sides 102e; one or more of the major sides and the minor sides arch inwards from the end portions.

One or both major sides 102d may comprise a longitudinal channel 102f on each side of the body. The channel preferably comprises a length of 70% of length A of the body 102a or 100% of the length B of the major side 102d.

Channel 102f may be used to teach proper chewing behavior for pets by using their molars and incisors. Channel 102f preferably comprises an indented depth (relative to the top, i.e. bottom, surface of major side 102d) of approximately 5 mm that may be used filled with a treat such as peanut butter or with frozen chicken broth or even if just filled with water causes the pet to engage with the destruction resistant pet toy 100.

Each end of channel 102f may comprise rounded ends, but the ends may also be rectangular. The corners between channel 102f and the top, i.e. bottom, surface of major side 102d may be rounded, elongated, chamfered, inset, or treated in some other way to prevent injury to the pet.

FIG. 2A is an isometric view of a destruction resistant pet toy in accordance with one or more embodiments of the present invention. FIG. 2B is a transverse cross-sectional view of the destruction resistant pet toy of FIG. 2A. FIG. 2C is a longitudinal cross-sectional view of the destruction resistant pet toy of FIG. 2A.

A destruction resistant pet toy 200 includes one or more transverse members that cause the pet to have continued engagement with toy 200, i.e. general criteria (4), to engage in prolonged chewing behavior with the destruction resistant pet toy 200, while the shape prolongs the time the pet interacts with the toy and engages in chewing behavior.

Destruction resistant pet toy 200 comprises the destruction resistant material or the destruction resistant nylon. In accordance with one or more embodiments of the present invention, pet toy 200 preferably consists of the destruction resistant nylon. In any case, excellent destruction resistance, especially in a solid form, is achieved by using the destruction resistant material or the destruction resistant nylon.

Destruction resistant pet toy 200 comprises a longitudinal member 210, one or more longitudinal arcs 220, and one or more cross member 230. Longitudinal member 210 preferably comprises a longitudinal body member 212 that may have any suitable shape. Member 210 preferably comprises one or more end portions 214 that transition seamlessly from longitudinal body member 212. For example, if preferably longitudinal body member 212 comprises a disk-shaped or circular cross-section and comprises and an inwardly arcing outer surface, then end portions 214 may comprises bulbous ends. This particular shape advantageously causes the pet to engage in prolonged chewing behavior since it is an interesting shape as determined by empirical evidence.

One or more longitudinal arcs 220 are joined, preferably integrally, to longitudinal member 210 at any suitable points or points along longitudinal member 210, but preferably at the juncture of longitudinal body member 212 and end portion or end portions 214.

When viewed in a transverse cross-section with longitudinal member 212 in the center, there may be a pair of arcs 220 at opposed sides or a plurality of arcs 220 spaced equivalently or unequally about longitudinal member 212. In a longitudinal view, each end of the arc 220 may be joined to a different point on the longitudinal member 212. Thus, one arc may have one end joined at the juncture of the longitudinal body member 212 and end portion 214, while another end may be joined to end portion 214 or to longitudinal body member 212.

One more cross members 230 preferably comprise a substantial disk shape having the major plane that is oriented transversely or oblique to the longitudinal axis of the longitudinal member 210. Each cross member intersects the longitudinal member 210 and each arc 220. One or more cross-members may comprise an additional stabilizer 232. The stabilizer preferably comprises or, even more preferably, consists of a cylinder that extends from one side of destruction resistant pet toy 200 to the other side.

When more than one arc 220 is present in destruction resistant pet toy 200, the arcs preferably are symmetrically spaced longitudinally and transversely about longitudinal member 210 and cross members 230 are preferably oriented transversely to the longitudinal axis of member 210 to produce a shape as shown in FIGS. 2a-2c that rolls easily to provide a prolonged interaction while the angles between the arcs and the cross members cause the pet to engage in prolonged chewing behavior. However, assymetric placements of the arc relative to member 210 both longitudinally and transversely are also embodied in the present invention and/or cross members that are obliquely oriented with respect to member 210 are also embodied in the present invention.

Figure 3C:
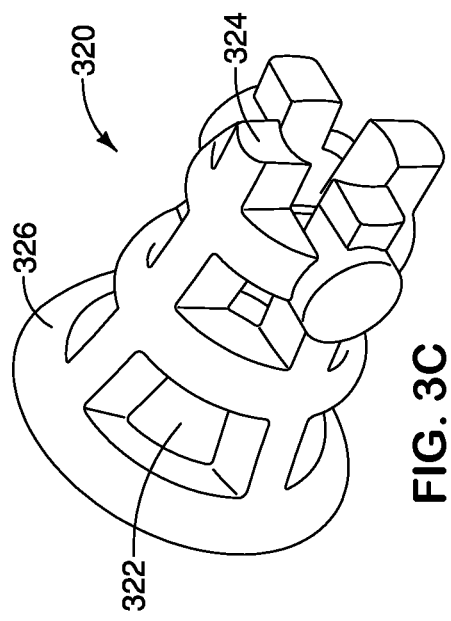
FIG. 3C is a transverse cross-sectional view of the portion of the destruction resistant pet toy of FIG. 3B.
Figure 3D:
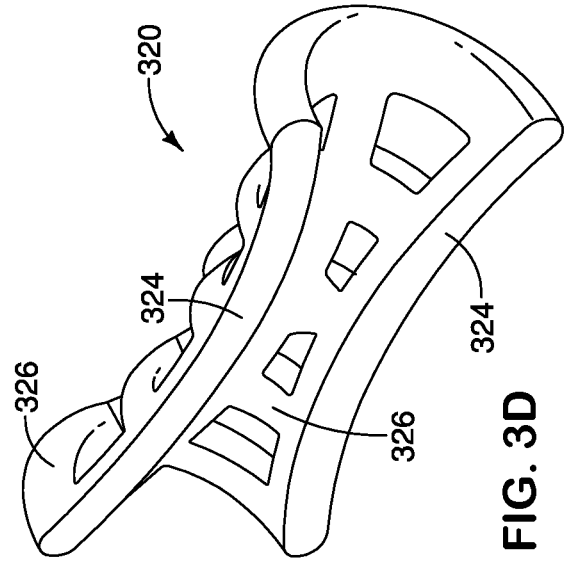
FIG. 3D is a longitudinal cross-sectional view of the portion of the destruction resistant pet toy of FIG.3B.
Figure 3A:
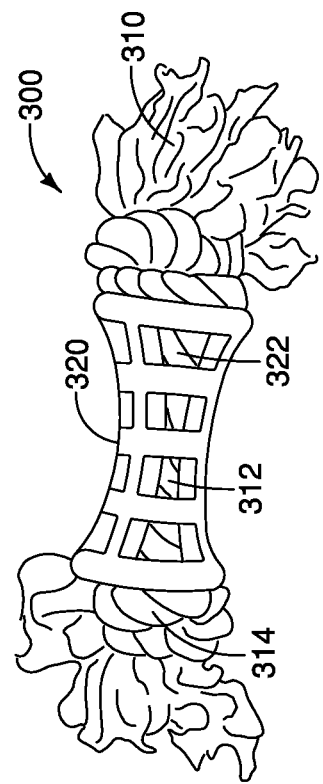
FIG. 3A is a front view of a destruction resistant pet toy in accordance with one or more embodiments of the present invention.
Figure 3B:
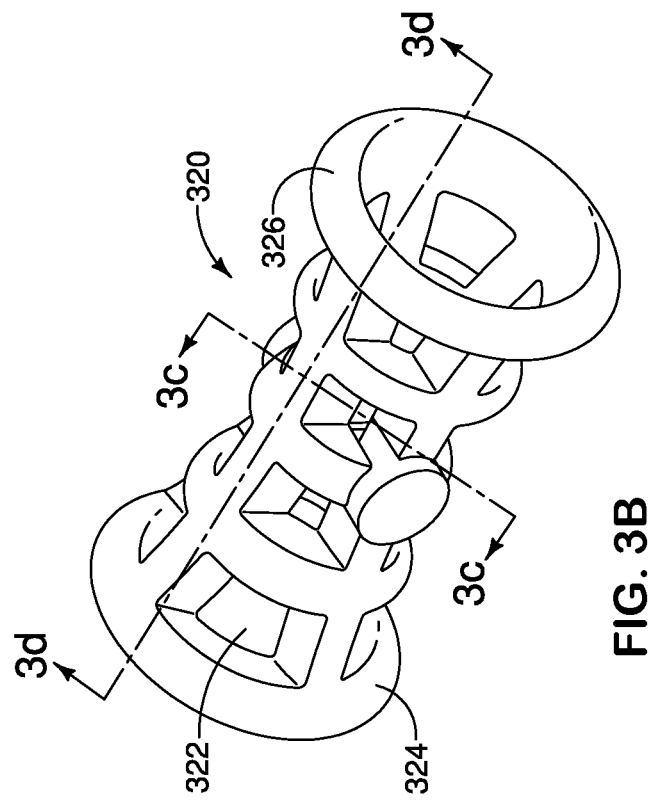
FIG. 3B an isometric view of a portion of the destruction resistant pet toy in accordance with one or more embodiments of the present invention.

FIG. 3A is a front view of a destruction resistant pet toy in accordance with one or more embodiments of the present invention. FIG. 3B is an isometric view of a portion of the destruction resistant pet toy in accordance with one or more embodiments of the present invention. FIG. 3C is a transverse cross-sectional view of the portion of the destruction resistant pet toy of FIG. 3B. FIG. 3D is a longitudinal cross-sectional view of the portion of the destruction resistant pet toy of FIG. 3B.

A destruction resistant pet toy 300 includes an inner member 310 comprising a material other than a destruction resistant nylon and an outer member 320 comprising or preferably consisting of the destruction resistant nylon. Outer member 320 provides suitable access for the teeth of a pet to inner member 310 through one or more openings 322 in outer member 320. Therein, a pet finds continued engagement with 300, i.e. meet general criteria (4), by the difference in material hardness and textures that causes the pet to engage in prolonged chewing behavior.

Preferably, inner member 310 comprises a rope made of cotton rope, but any other suitable material such as soft nylon fibers, cotton fibers, sisal, or any of combination thereof may be used, while outer member 320 comprises or preferably consists of the destruction resistant nylon. Both the cost and texture of cotton rope provides the ideal material difference to the destruction resistant nylon of outer member 320 to have the pet engage in prolonged chewing behavior and to promote healthy gums and teeth. Inner member 310 preferably comprises a longitudinal portion 312 and knotted ends 314 for both aesthetic appeal and to retain the longitudinal portion in outer member 320.

Outer member 320 may comprise any suitable shape. However, preferably to keep inner member 310 from moving relative to outer member 320, outer member 320 comprises a elongated skeletal shape, preferably a tubular shape having concave sides. The skeletal shape comprises a plurality of longitudinal ribs 324 and a plurality of transverse ribs 326 that are substantially perpendicular to each other. Therein, destruction resistant pet toy 300 preferably consists of four longitudinal ribs and five transverse ribs which provide an optimal and unexpected benefit to a pet in accessing inner member.

Openings 322 are preferably regularly spaced and have rectangular shaped apertures that are inset with chamfered or rounded corners. Other types of spacings and/or shapes are also contemplated. However, it is desirable that the openings have a size of 5-10 mm on each side (as measured on the surface closest to the inner member) to accommodate the incisors of a dog.

In accordance with one or more embodiments of the present invention, inner member 310 may also be the second-type material is one or more natural or synthetic rubber compounds, styrene butadiene styrene (SBS), and/or styrene ethylbutadiene styrene (SEBS). Preferably, the second-type material has a Shore A hardness. Therein, the inner member is formed by molding within the outer member or separately therefrom.

Figure 4B:
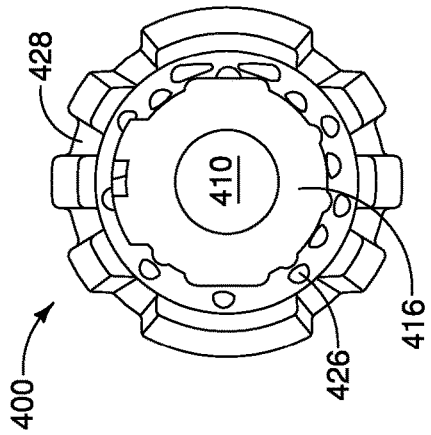
FIG. 4B is a first transverse cross-sectional view of the destruction resistant pet toy of FIG.4A.
Figure 4C:
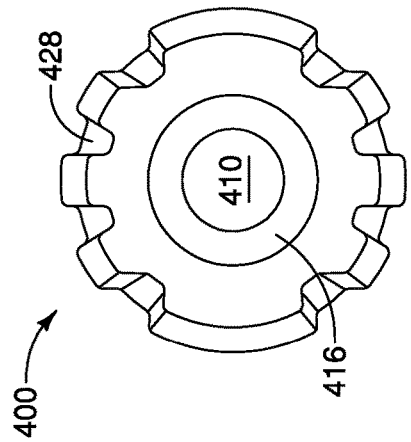
FIG. 4C is a second transverse cross-sectional view of the destruction resistant pet toy of FIG.4A.
Figure 4A:
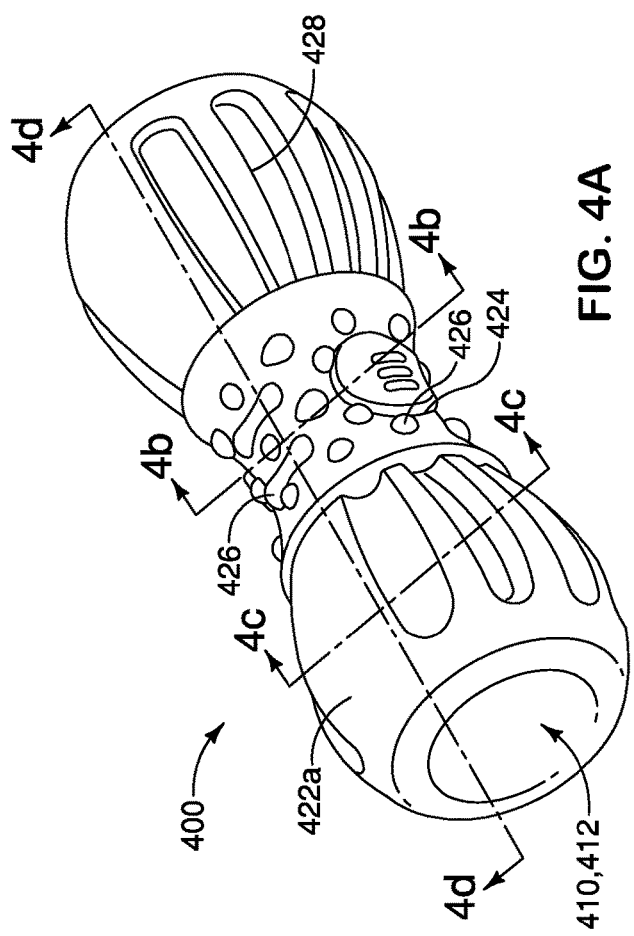
FIG. 4A is an isometric view of a destruction resistant pet toy in accordance with one or more embodiments of the present invention.
Figure 4D:
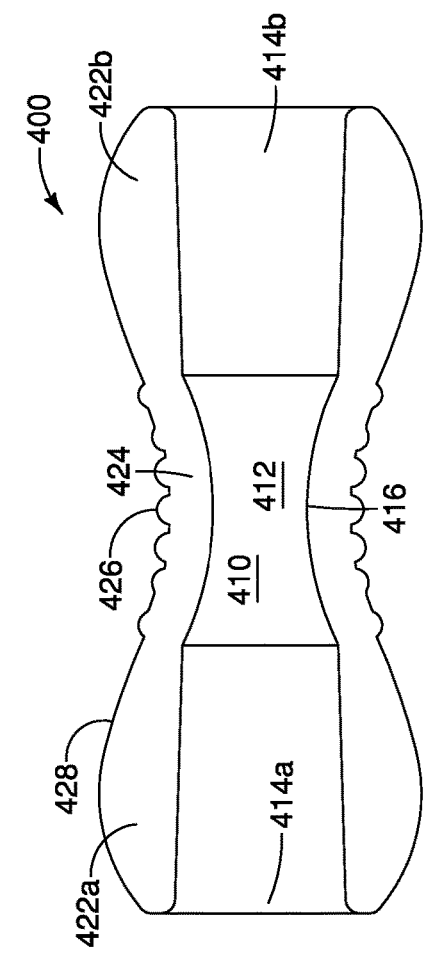
FIG. 4D is a longitudinal cross-sectional view of the destruction resistant pet toy of FIG. 4A.

FIG. 4A is an isometric view of a destruction resistant pet toy in accordance with one or more embodiments of the present invention. FIG. 4B is a first transverse cross-sectional view of the destruction resistant pet toy of FIG. 4A. FIG. 4C is a second transverse cross-sectional view of the destruction resistant pet toy of FIG. 4A. FIG. 4D is a longitudinal cross-sectional view of the destruction resistant pet toy of FIG. 4A.

A destruction resistant pet toy 400 may comprise the destruction resistant material or destruction resistant nylon for the reasons mentioned above. In accordance with one or more embodiments of the present invention, pet toy 400 preferably consists of the destruction resistant nylon for the reasons given above.

The destruction resistant pet toy comprises a longitudinal through-passage 410 defining an interior space 412 for placing a treat into the interior space. The through-passage comprises end openings 414a, 414b that are wider or has a greater cross-section than an inner constriction 416 midway between the openings. The constriction helps a user in retaining a treat and preventing the treat from unintentionally exiting from the opposed end opening.

Destruction resistant pet toy 400 has a substantially barbell shape 420 having two end portions 422a, 422b and a center portion 424. Each of the end portions comprises a first texture 426 and the center portion comprises a second texture 428 that is texturally opposite to the second texture. For example, first texture 426 may be evenly spaced flutes, while second texture 428 may comprise raised dots and/or raised stripes. To further differentiate the textures, center portion 424 may be offset, banded, and/or raised relative the end portions and, thus, discern second texture 428 more easily by a pet's mouth.

Therein, a pet finds continued engagement with destruction resistant pet toy 400, i.e. meeting general criteria (4), by the difference in textures and a through-passage for hiding a treat, both of which causes the pet to engage in prolonged chewing behavior.

Figure 5C:
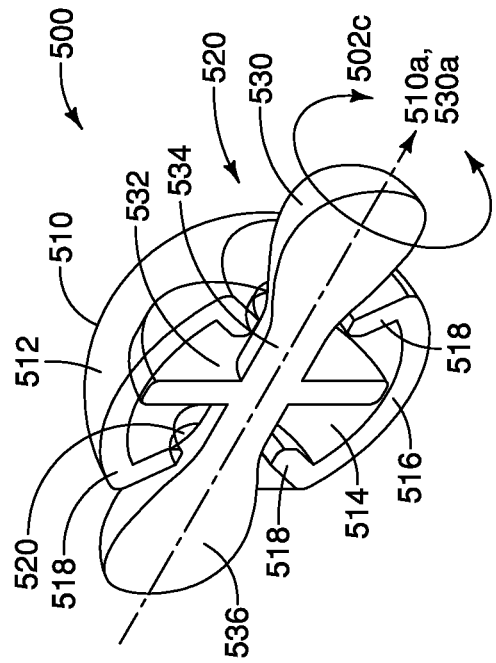
FIG. 5C is a first longitudinal cross-sectional view of the destruction resistant pet toy of FIG.5A.
Figure 5D:
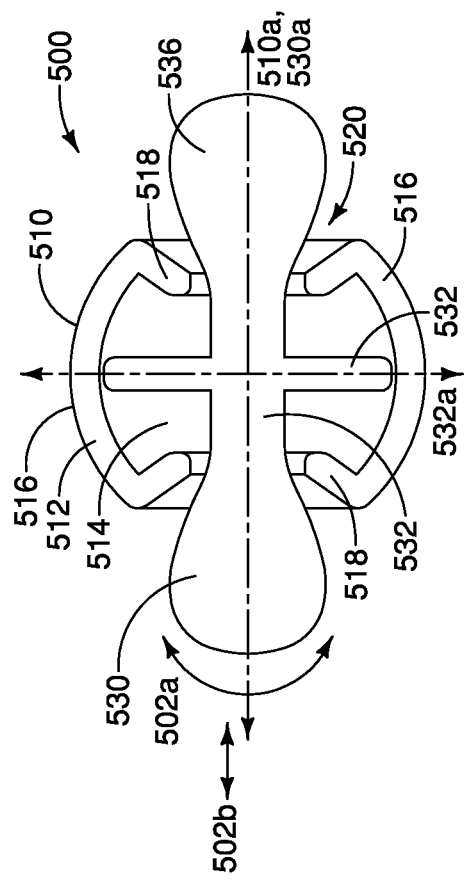
FIG. 5D is a second longitudinal cross-sectional view of the destruction resistant pet toy of FIG.5A.
Figure 5A:
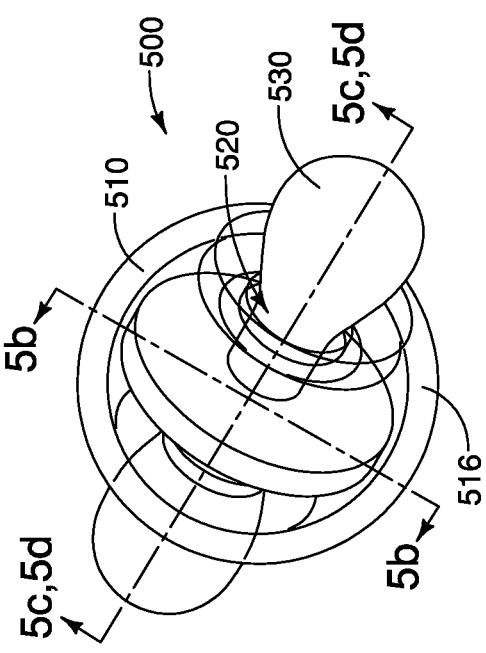
FIG. 5A is an isometric view of a destruction resistant pet toy in accordance with one or more embodiments of the present invention.
Figure 5B:
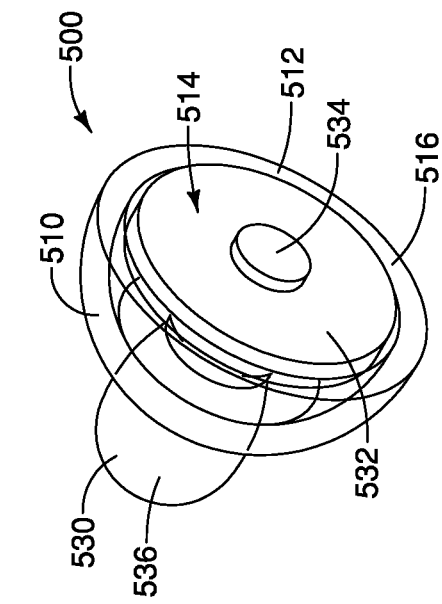
FIG. 5B is a transverse cross-sectional view of the destruction resistant pet toy of FIG. 5A.

FIG. 5A is an isometric view of a destruction resistant pet toy in accordance with one or more embodiments of the present invention. FIG. 5B is a transverse cross-sectional view of the destruction resistant pet toy of FIG. 5A. FIG. 5C is a first longitudinal cross-sectional view of the destruction resistant pet toy of FIG. 5A. FIG. 5D is a second longitudinal cross-sectional view of the destruction resistant pet toy of FIG. 5A.

A destruction resistant pet toy 500 comprises an outer member 510 and an inner member 530. Outer member 510 comprises one or more materials other than the destruction resistant nylon, i.e. one or more second-type material. Preferably, each of the second-type materials comprises a resilient, flexible, and/or pliable material such as one or more natural or synthetic rubber compounds, styrene butadiene styrene (SBS), and/or styrene ethylbutadiene styrene (SEBS). Therein, each of the second-type materials is more resilient, flexible, and/or pliable than the destruction resistant nylon.

Inner member 530 may comprise any suitable material, but preferably comprises or, even more preferably, consists of the destruction resistant nylon. Therein, the destruction resistant nylon is a substantially harder material than the softer second-type material of the other member.

Outer member 510 comprises a shell 512 that may have any suitable shape. Shell 512 defines an inner space 514 and has one or more regular wall zones 516 and one and/or more deformed wall zones 518. The one or more regular wall zones may wholly or in part define a shape such as a ball, a cube, or a multi-sided body and giving outer member 510 a substantially the shape of that body.

Each deformed wall zone is located adjacent to and/or defines an opening 520 through which one or more portions of inner member 530 extend. Thus, the shell comprises one or more openings 520, but preferably consists of two openings 520. The one or more deformed wall zones 518 are preferably deformed to permit an inner member 530 to freely move relative to outer member 510 as indicated by arrows 502a, 502b and 502c and have that movement be easily recognized by the pet.

Inner member 530 comprises a medial section 532 retained within the inner space of the outer member, one or more connecting sections 534 extending through one or more respective openings 520, and one or more end sections 536 disposed away from the outer member 510 and engaged by the pet. The medial section is sized to fit within inner space 514 with play so that the medial section moves freely relative to the outer member.

Deformed wall zones 518 retain medial section 532 within the inner space of the outer member. In an exemplary embodiment illustrated in FIGS. 5a-5d, regular wall zones 516 may in part define a shape of a ball giving outer member 510 a substantially the shape of a ball and giving inner space 514 is substantially a spherical space. Advantageously, in the exemplary embodiment medial section 532 may be formed to be a disk with rounded edges as shown in the drawing figures. Similarly, advantageously, in the exemplary embodiment, in the deformed wall zones 518 are deformed inward relative to a regularized outer surface of the outer member to retain the medial section within the inner space.

In general, medial section 532 has an axis 532a that is preferably perpendicular, or perpendicular within 25 degrees, to a longitudinal axis 530a of inner member 530. However, medial section 532 may have any other suitable shape that permits it to be retained within the inner space with play. The one or more connecting sections 534 may have any suitable shape but are preferably elongated and thin to minimize the requisite size of opening 520. Moreover, the one or more connecting sections are preferably circular in cross-section to complement the shape of openings 520. The one or more end sections 536 may have any suitable shape and are entirely outside the inner space of outer member 510, but preferably comprise bulbous ends that are easy to bite by a pet and are larger, for example in the cross-section, than an opening 520 associated with the one or more end section. Bulbous ends advantageously causes the pet to engage in prolonged chewing behavior since it is an interesting shape as determined by empirical evidence.

When a pet engages with the inner member, inner member 530 moves relative to outer member 510. This movement may be along arrow 502a wherein a longitudinal axis 530a of the inner member moving axially relative to a longitudinal axis 510a of the outer member, i.e. swivels. This movement also preferably requires a transverse axis 534a of the medial section, which is preferably perpendicular to longitudinal axis 530, to move at an angle relative to longitudinal axis 510a.

Another movement may be along arrow 502b wherein inner member 530 is pulled relative to outer member 510, i.e. pulled or slides; and/or along arrow 502c wherein inner member 530 rotates about its own longitudinal axis 530a and relative to longitudinal axis 510a, i.e. spins.

In accordance with one or more embodiments of the present invention, pet toy 500 may be made by forming inner member 530 as a single integral item and forming outer member 510 as a single integral item. Therein, outer member 510 is preferably formed by molding. When the outer member 510 is still hot and pliable, at least a portion of inner member 530, is passed through a first opening 520. Medial section 534 is then lodged in the inner space of the outer member. An end section and an associate portion of the connecting section then exit a second opening 520 to seat the inner member into a final assembled position of pet toy 500.

In accordance with one or more embodiments of the present invention, pet toy 500 may be made by forming outer member 510 about medial section 534 in a manner that permits the medial section to able to move relative to the outer member 510. Medial section 534 comprises an opening permitting the other portions of the inner member to connect to the medial section. For example, the opening of the medial section includes a threading. Thus, one end of a first connecting section 532 passes through opening 520 and is secured into the medial sections. An end of a second connecting section 532 is then passed through another opening 520 and is connected to both the medial section and the first connecting section 532.

Therein, a pet finds continued engagement with destruction resistant pet toy 500, i.e. meeting general criteria (4), by the difference in textures of the material, the movement of the inner member relative to the outer member, and the noise caused by the noisemaker when the pet engages in prolonged chewing behavior.

FIG. 6A is an isometric view of a destruction resistant pet toy in accordance with one or more embodiments of the present invention. FIG. 6B is a transverse cross-sectional view of the destruction resistant pet toy of FIG. 6A. FIG. 6C is a longitudinal cross-sectional view of the destruction resistant pet toy of FIG. 6A.

A destruction resistant pet toy 600 comprises an first member 610 and an second member 630. First member 610 comprises one or more materials other than the destruction resistant nylon, i.e. one or more second-type material. Preferably, each of the second-type materials comprises a resilient, flexible, and/or pliable material such as one or more natural or synthetic rubber compounds, styrene butadiene styrene (SBS), and/or styrene ethylbutadiene styrene (SEBS). Therein, each of the second-type materials is more resilient, flexible, and/or pliable than the destruction resistant nylon.

Second member 630 may comprise any suitable material, but preferably comprises or, even more preferably, consists of the destruction resistant nylon. Therein, the destruction resistant nylon is a substantially harder material than the softer second-type material of the other member.

First member 610 comprises a first portion 610a and a second portion 610b. The first portion 610a is a substantially spherical surface of the first member 610. The second portion 610b is disposed adjacent the first portion 610a. The first member 610 further comprises a shell 612 that may have any suitable shape. Shell 612 defines an inner space 614 and has one or more regular wall zones 616 and one and/or more deformed wall zones 618. The one or more regular wall zones may wholly or in part define a body such as a ball, a cube, or a multi-sided body and giving first member 510 a substantially the shape of that body.

Each deformed wall zone is located adjacent to and/or defines an opening 620 through which one or more portions of second member 630 extend. Thus, the shell comprises one or more openings 620, but preferably consists of two openings 620. Specifically, the second portion 610b of the first member 610 includes the two openings 620. The one or more deformed wall zones 618 are preferably deformed to permit second member 630 to be accessible to the pet.

Each deformed wall zone is located adjacent to and/or defines an opening 620 through which one or more portions of second member 630 extend. Thus, the shell comprises one or more openings 620, but preferably consists of two openings 620. The one or more deformed wall zones 618 are preferably deformed to permit second member 630 to be accessible to the pet.

Second member 630 comprises a retaining structure 632, one or more median sections 633, and one or more end sections 636 disposed away from the first member 610 and engaged by the pet. In general, the retaining structure 632 is adjacent to opening 620 and comprises any means to secure the second member 630 to shell 612 and, therein, preferably to secure the second member to the deformed wall zone peripheral to opening 620. However, the retaining structure may also secure second member 630 to the regular wall zone peripheral to an opening 620 formed in the regular wall zone.

Retaining structure 632 comprises a retainer 632a preferably formed as a backing plate that is disposed in inner space 614, a receiving member 632b that is preferably shaped as a groove, and a fitting section 632c. Retainer 632a may have any suitable shape, but preferably comprises a plate having a shape that is complementary to opening 620, i.e., a shape that extends at one or more portions beyond the periphery of the opening and prevents the second member from being extracted from first member 610. The periphery of opening 620 comprises at least in part of wholly a recessed shell wall portion 612a that is received in receiving member 632b. Preferably, shell wall 612a is received with in receiving member 632b, preferably, with a friction fit. Fitting section 632c is disposed in the recessed portion of wall portion 612a. Glue, adhesive, or heat treatments such infrared radiation may be applied to one or both retaining structure 632 and the shell wall proximal to opening 620 and used to assure that the surfaces retaining structure 632 bond to shell 612, i.e., shell wall portion 612a.

The one or more connecting sections 634 may have any suitable shape but are preferably elongated. The one or more end sections 636 may have any suitable shape, but preferably comprise bulbous ends that are easy to bite by a pet and are larger, for example in the cross-section, than an opening 620 associated with the one or more end section. Bulbous ends advantageously causes the pet to engage in prolonged chewing behavior since it is an interesting shape as determined by empirical evidence.

To add more excitement to destruction resistant pet toy 600, one or more of the second members 630 comprises a noise making structure 638. The noise making structure comprises a cavity 638a for receiving a noisemaker, such as a squeaker known generally in the art and/or a squeaker disclosed in U.S. Pat. No. 7,736,212 and hereby incorporated by reference in its entirety for all purposes, and an air channel 638b. Noise making structure connects inner space 614 to ambient air, specifically connects a volume of air held in the inner space to the ambient air. When a force, such one cause by throwing of the toy or by being bitten, is applied destruction resistant pet toy 600, air leaves inner space 614 and passes through the noisemaker in cavity 638a causing a noise and continues out through air channel 638b. To equalize pressure, the air may return via the noise making structure 638 to inner space 614. However, a small opening (not shown) may also be made through shell 612 of first member 610 to permit more efficient pressure equalization between the ambient environment and inner space 614.

In the exemplary embodiment illustrated in FIGS. 6a-6c, regular wall zones 616 may in part define a shape of a ball giving first member 610 a substantially the shape of a ball and giving inner space 614 is substantially a spherical space. Advantageously, the deformed wall zones 618 are deformed inward relative to a regular wall zones 616 of the first member so that end sections 636 are accessible to a pet.

When a pet engages with the second member at the end section, second member 630 stays connected to first member 610, but cause the first member to change shape as forces and pressures are exerted on the toy. In turn, this causes the inner space to decrease and expel air through the noisemaker and creating sounds.

In accordance with one or more embodiments of the present invention, destruction resistant pet toy 600 may be made by forming second member 630 as a single integral item and forming first member 610 as a single integral item. Therein, first member 610 is preferably formed by molding. When the first member 610 is still hot and pliable, at least a portion of second member 630, is passed through opening 620 and secured in wall portion 612.

Destruction resistant pet toy 600 may also be made by forming first member 610 as a single piece. Second member 610 may be formed as a two piece structure wherein one structure is retainer 632a and/or receiving member 632b the second structure are all portions of the second member. The first structure is passed through opening 620 and then located such that is accessible through opening 620. The second structure is then joined to the first structure. This may be accomplished by having threaded portions on the first structure and screwing the second structure to the first structure. Other ways to secure the first structure and the second structure by use of glues and/or adhesive, mechanical interlocks such as snap fit connections, or heating the first and second structure by any means to cause a connection.

Therein, a pet finds continued engagement with destruction resistant pet toy 600, i.e. meeting general criteria (4), by the difference in textures of the material, the movement of the second member relative to the first member, and the noise caused by the noisemaker when the pet engages in prolonged chewing behavior.

FIG. 7A is an isometric view of a destruction resistant pet toy in accordance with one or more embodiments of the present invention. FIG. 7B is a first transverse cross-sectional view of the destruction resistant pet toy of FIG. 7A. FIG. 7C is a second transverse cross-sectional view of the destruction resistant pet toy of FIG. 7A. FIG. 7D is a longitudinal cross-sectional view of the destruction resistant pet toy of FIG. 7A.

A destruction resistant pet toy 700 comprises a first member 710 and a second member 730. First member 710 may comprise any suitable material, but preferably comprises or, even more preferably, consists of the destruction resistant nylon. Therein, the destruction resistant nylon is a substantially harder material than the softer second-type material of the other member. Second member 730 comprises one or more materials other than the destruction resistant nylon, i.e. one or more second-type material. Preferably, each of the second-type materials comprises a resilient, flexible, and/or pliable material such as one or more natural or synthetic rubber compounds, styrene butadiene styrene (SBS), and/or styrene ethylbutadiene styrene (SEBS). Therein, each of the second-type materials is more resilient, flexible, and/or pliable than the destruction resistant nylon.

The first member may have any suitable shape, but preferably comprises a hollow protective structure 712 defining an inner space 714. Protective structure 712 may have suitable shape, but preferably has a generally tubular cross-section even if the sides of protective structure 712 may be concave. Inner space 714 preferably has a circular cross-section. Protective structure 712 comprises one or more lateral openings 716 permitting a pet's teeth access to a portion of the second member. In one preferred embodiment, toy 700 comprises or, even more preferably, consists of two lateral openings 716 that are spaced opposite each other to permit teeth from the upper jaw and teeth for the lower jaw access to a portion of the second member. The ends 718 of protective structure 712 may have any suitable shape, but preferably, each end is formed as a transverse wall surface 720.

Second member 730 comprises a shell 732 defining an inner space 734. Shell 732 has a medial section 736 and one or more end sections 738. The medial section preferably extends the length of protective structure 712. Medial section 736 has a cross-section that matches the cross-section of inner space 714, but is sized such that the second member 730 rotates freely relative to the first member. Medial section 736 comprises a segment 736a of which one or more portions are exposed through respective openings 716.

The one or more end sections may have any suitable shape, but one or more end sections preferably are shaped to be bulbous to present an attractive object to a pet. Bulbous ends advantageously causes the pet to engage in prolonged chewing behavior since it is an interesting shape as determined by empirical evidence. One or more end sections 738 have a transverse wall 740 and/or a dome-shaped end surface 742.

To add more excitement to destruction resistant pet toy 700, a noisemaker, such as a squeaker known generally in the art and/or a squeaker disclosed in U.S. Pat. No. 7,736,212 and hereby incorporated by reference in its entirety for all purposes, may be joined to the shell. A suitable place for a squeaker is in one of the end sections. When a force, such one cause by throwing of the toy or by being bitten, is applied destruction resistant pet toy 700 air leaves inner space 734 and passes through the noisemaker causing a noise. To equalize pressure, the air may return via the noisemaker to inner space 734. However, a small opening (not shown) may also be made through shell 732 to permit more efficient pressure equalization between the ambient environment and inner space 730.

When a pet engages with destruction resistant pet toy 700, the pet use a canine and bite the one or more exposed portions of segment 736a. To access segment 736a, the pet will also have to bite on first member 710. Therein, the difference in texture between the destruction resistant nylon of the first member and the softer material of the second member causes the pet to continue engaging destruction resistant pet toy 700.

If a noisemaker is provided in the second member, when the pet bites segment 736a or end sections 730, the pet will cause a noise. The noise continues engaging the pet with destruction resistant pet toy 700. Moreover, when the pet bites the end sections, it may twist, is rotate the second member relative to the first member along arrow 744.

In accordance with one or more embodiments of the present invention, destruction resistant pet toy 700 may be made by forming first member 710 as a single integral item and forming second member 730 as a single integral item. One end section 738 of the second member folded and/or compressed and advanced beginning at a first end 718 through the inner space 714 so that it comes to rest on the second end 718.

Therein, a pet finds continued engagement with destruction resistant pet toy 700, i.e. meeting general criteria (4), by the difference in textures of the material, the movement of the second member relative to the first member, and the noise caused by the noisemaker when the pet engages in prolonged chewing behavior.

While the invention has been described in conjunction with specific embodiments, it is to be understood that many alternatives, modifications, and variations will be apparent to those skilled in the art in light of the foregoing description.

What is claimed is:

1. A destruction resistant pet toy comprising:
   a first member constructed from a first material, the first member defining a shell having an opening, the shell having a first portion and a second portion, the first portion being a substantially spherical surface, the second portion being a concave surface with respect to the spherical surface of the first portion, the concave surface including the opening;
   a second member extending through the opening of the shell of the first member from an inner space of the pet toy such that the second member extends outwardly away from the inner space farther than the entirety of the first member, the second member being constructed of a destruction resistant nylon material having a Shore D hardness that is harder than the first material, the second member having a retention structure configured to secure the second member to the first member, the retention structure including a backing plate and a receiving groove arranged adjacent to the backing plate,
   the first member having a section arranged in the receiving groove of the second member.

2. The destruction resistant pet toy of claim 1, further comprising
a squeaker mounted in the second member and the inner space of the first member, the squeaker being configured to emit a sound when air leaves the inner space.

3. The destruction resistant pet toy of claim 1, wherein the second member has a cavity for housing a squeaker.

4. The destruction resistant pet toy of claim 1, wherein the concave surface includes a wall zone contacting the backing plate of the second member, the wall zone being configured to deform when the second member is received through the opening.

5. The destruction resistant pet toy of claim 4, wherein the second member further includes a bulbous end section.

6. The destruction resistant pet toy of claim 5, wherein the end section is disposed proximal to the wall zone of the shell.

7. The destruction resistant pet toy of claim 1, wherein the concave surface of the second portion is a first concave surface, the first member further includes a third portion having second concave surface with respect to the spherical surface of the first portion, the first and second concave surfaces being disposed on laterally opposite sides of the first portion.

8. The destruction resistant pet toy of claim 7, wherein the opening of the first concave surface is a first opening, the second concave surface includes a second opening.

9. The destruction resistant pet toy of claim 8, wherein the second member includes a first bulbous section and a second bulbous section, the first bulbous section extends through the first opening and the second bulbous section extends through the second opening.

10. The destruction resistant pet toy of claim 1, wherein the second member is a single integral member.

* * * * *